US011896543B2

(12) United States Patent
Glassman

(10) Patent No.: US 11,896,543 B2
(45) Date of Patent: Feb. 13, 2024

(54) MANIPULATOR FOR A MASSAGE DEVICE

(71) Applicant: Gregory Ford Glassman, Port Washington, NY (US)

(72) Inventor: Gregory Ford Glassman, Port Washington, NY (US)

( * ) Notice: Subject to any disclaimer, the term of this patent is extended or adjusted under 35 U.S.C. 154(b) by 0 days.

(21) Appl. No.: 18/132,520

(22) Filed: Apr. 10, 2023

(65) Prior Publication Data

US 2023/0320927 A1 Oct. 12, 2023

Related U.S. Application Data

(60) Provisional application No. 63/328,996, filed on Apr. 8, 2022.

(51) Int. Cl.
*A61H 23/00* (2006.01)

(52) U.S. Cl.
CPC ... *A61H 23/006* (2013.01); *A61H 2201/0107* (2013.01); *A61H 2201/0153* (2013.01); *A61H 2201/0157* (2013.01); *A61H 2201/0161* (2013.01); *A61H 2201/0192* (2013.01); *A61H 2201/0207* (2013.01); *A61H 2201/0214* (2013.01); *A61H 2201/0285* (2013.01); *A61H 2201/1253* (2013.01); *A61H 2201/1669* (2013.01); *A61H 2201/1676* (2013.01); *A61H 2205/04* (2013.01); *A61H 2205/062* (2013.01); *A61H 2205/081* (2013.01)

(58) Field of Classification Search
CPC .......... A61H 23/006; A61H 2201/0107; A61H 2201/0153; A61H 2201/0157; A61H 2201/0161; A61H 2201/0192; A61H 2201/0207; A61H 2201/0214; A61H 2201/0285; A61H 2201/1253; A61H 2201/1669; A61H 37/00
See application file for complete search history.

(56) References Cited

U.S. PATENT DOCUMENTS 1,528,129 A 3/1925 Phillips
4,520,798 A 6/1985 Lewis
(Continued)

FOREIGN PATENT DOCUMENTS

CN 211723937 U 10/2020
JP 3543344 B2 7/2004

OTHER PUBLICATIONS

International Search Report and Written Opinion issued by the ISA/US in connection with International Application No. PCT/US2023/017984, dated Aug. 23, 2023.

*Primary Examiner* — Quang D Thanh
(74) *Attorney, Agent, or Firm* — CARTER, DELUCA & FARRELL LLP; George Likourezos

(57) ABSTRACT

A manipulator for a massage device includes a pair of main rods having a first end pivotably coupled to a first elbow assembly and a second end opposite the first end that is pivotably coupled to a second elbow assembly. The pair of main rods is transitionable between a first configuration and a second configuration, wherein, when in the first configuration the pair of main rods define a first length and when in the second configuration the pair of main rods define a second length greater than the first length. The manipulator further includes a first arm rod pivotably coupled to the first elbow assembly, and a second arm rod pivotably coupled to the second elbow assembly.

9 Claims, 13 Drawing Sheets

(56) References Cited

U.S. PATENT DOCUMENTS

| | | | |
|---|---|---|---|
| 5,848,980 | A | 12/1998 | Demerais |
| 5,935,090 | A | 8/1999 | Kennon |
| 6,332,873 | B1 | 12/2001 | Naruse et al. |
| 6,428,496 | B1 * | 8/2002 | Sargent ................ A61H 1/0292 606/241 |
| 6,758,826 | B2 | 7/2004 | Luettgen et al. |
| 6,988,997 | B2 | 1/2006 | Stultz |
| 2003/0078524 | A1 | 4/2003 | Young et al. |
| 2010/0234771 | A1 * | 9/2010 | Ingrassia ................ A61H 37/00 601/1 |
| 2017/0056284 | A1 | 3/2017 | Kramer |
| 2017/0360650 | A1 * | 12/2017 | DiBenedetto .......... A61H 15/00 |
| 2020/0222271 | A1 * | 7/2020 | Forostenko ........ A61H 15/0092 |
| 2021/0315769 | A1 | 10/2021 | Shemiranipour et al. |
| 2021/0361519 | A1 | 11/2021 | Hagy |
| 2022/0117841 | A1 * | 4/2022 | Tellam ................. A61H 23/006 |

* cited by examiner

MANIPULATOR FOR A MASSAGE DEVICE

CROSS-REFERENCE TO RELATED APPLICATIONS

This application claims priority to and the benefit of the filing date of U.S. Provisional Application No. 63/328,996, filed on Apr. 8, 2022, the disclosure of which is hereby incorporated by reference herein in its entirety.

TECHNICAL FIELD

This disclosure relates to massage devices, and particularly, to a device for holding a massage device to enable a user to self-massage oneself.

BACKGROUND

Many therapeutic handheld massagers provide therapeutic relief to sore or recovering portions of a person's body. However, many of these devices are limited to relieving areas a person is able to reach with the person's hands. For example, many handheld massage devices are impractical for a person to use on his or her back. In such instances, people often look to others to apply the massage device to reach those areas the person is unable to reach on the person's own to provide therapeutic relief to those areas. However, not every person is able to ask another person to provide such assistance. Some solutions include devices that mount the massage device to a doorway or to a cane shaped device so the person can target his or her back or other hard to reach area. However, these solutions are impractical as they are not ergonomically comfortable or require a doorway on which to be mounted. Thus, there is a need in the field for a solution to enable a person to ergonomically and easily self-massage all areas of his or her body.

SUMMARY

In accordance with an aspect of the present disclosure, a manipulator for a massage device is provided. The manipulator includes a pair of main rods having a first end pivotably coupled to a first elbow assembly and a second end opposite the first end that is pivotably coupled to a second elbow assembly. The pair of main rods is transitionable between a first configuration and a second configuration. When in the first configuration, the pair of main rods defines a first length, and when in the second configuration the pair of main rods defines a second length greater than the first length. The manipulator also includes a first arm rod pivotably coupled to the first elbow assembly, and a second arm rod pivotably coupled to the second elbow assembly.

In an aspect of the present disclosure, the manipulator may be transitionable from an extended configuration to a folded configuration.

In another aspect of the present disclosure, the manipulator further may include a mount coupled to the pair of main rods and configured to receive and secure a massage device.

In yet another aspect of the present disclosure, the mount includes: a first portion; a second portion; and straps for securing a massage device to the first portion and second portion, The first portion and the second portion define an opening for receiving a handle of a massage device.

In a further aspect of the present disclosure, the first portion and the second portion may be configured to be slidably adjusted.

In yet a further aspect of the present disclosure, the mount may include a plate defining an opening for receiving a handle of a massage device and a plurality of straps for securing a massage device to the plate.

In yet another aspect of the present disclosure, the first arm rod and the second arm rod may each be transitionable from a third length to fourth sixth length.

In a further aspect of the present disclosure, the mount may be slidably coupled to the pair of main rods such that the mount may be fixed to the main rod at any location along the pair of main rods.

In yet a further aspect of the present disclosure, the manipulator may further include a first handle coupled to the first arm rod and a second handle coupled to the second arm rod.

In yet another aspect of the present disclosure, the first arm rod and the second arm rod are removable.

In a further aspect of the present disclosure, each of the first elbow assembly and the second elbow assembly may include: a hinge lock; a first cross bar; a second cross bar parallel to the first cross bar; and a pair of rod couplers, wherein each rod coupler of the pair of rod couplers is configured to be mounted to a respective end portion of the first cross bar and the second cross bar.

In yet a further aspect of the present disclosure, the hinge lock may be disposed on the second cross bar in a pivotable manner and is configured to lock around the first cross bar.

In accordance with an aspect of the present disclosure, a holder for a massage device may include a first rail, a second rail, a third rail, a fourth rail, and a fifth rail, where the second and third rails are coupled to the first rail at a first end of each of the second and third rails, and the fourth and fifth rails are coupled to the second and third rails, respectively, to a second end of each of the second and third rails; a first handle and a second handle each coupled to the fourth and fifth rails, respectively; and a mount coupled to the first rail and configured to secure a massage device thereto.

In a further aspect of the present disclosure, the first, second, third, fourth and fifth rails may be arranged in an approximate U shape.

In yet a further aspect of the present disclosure, the first, second, third, fourth, and fifth rails may be slidably and pivotably coupled to each other to enable at least one of a width, length, or angle of the U shape to be modified.

In yet another aspect of the present disclosure, the first, second, third, fourth, and fifth rails each may include: an outer tube; and an inner tube slidably disposed in the outer tube.

In a further aspect of the present disclosure, the inner tube and the outer tube each may include a plurality of sockets for receiving a pin arranged along a longitudinal axis of each of the inner tube and the outer tube, whereby the first, second, third, fourth, and fifth rails are configured to transition from a first length to a second length by sliding the inner and outer tubes relative to each other and insertion of the pin into sockets of the plurality of sockets of the inner tube and the outer tube that are placed in alignment.

In yet a further aspect of the present disclosure, each outer tube includes a plurality of sockets for receiving a pin and arranged along a longitudinal axis of each outer tube. Each inner tube may include a button pin configured to be inserted into a socket of a respective outer tube, whereby depression of the button pin enables the inner tube to slide along the respective outer tube to be inserted into a different socket of the plurality of sockets of the respective outer tube to transition the respective first, second, or third rails from a first length to a second length.

In a further aspect of the present disclosure, the mount may be configured to rotate about a longitudinal axis of the first rail to adjust an angle between the mount and the first rail.

In yet a further aspect of the present disclosure, the mount may include a battery configured to electrically couple to a massage device to provide power to the massage device.

BRIEF DESCRIPTION OF THE DRAWINGS

The accompanying drawings, which are incorporated in and constitute a part of this specification, illustrate aspects and features of the disclosure and, together with the detailed description below, serve to further explain the disclosure, in which.

DETAILED DESCRIPTION

Figure 1:
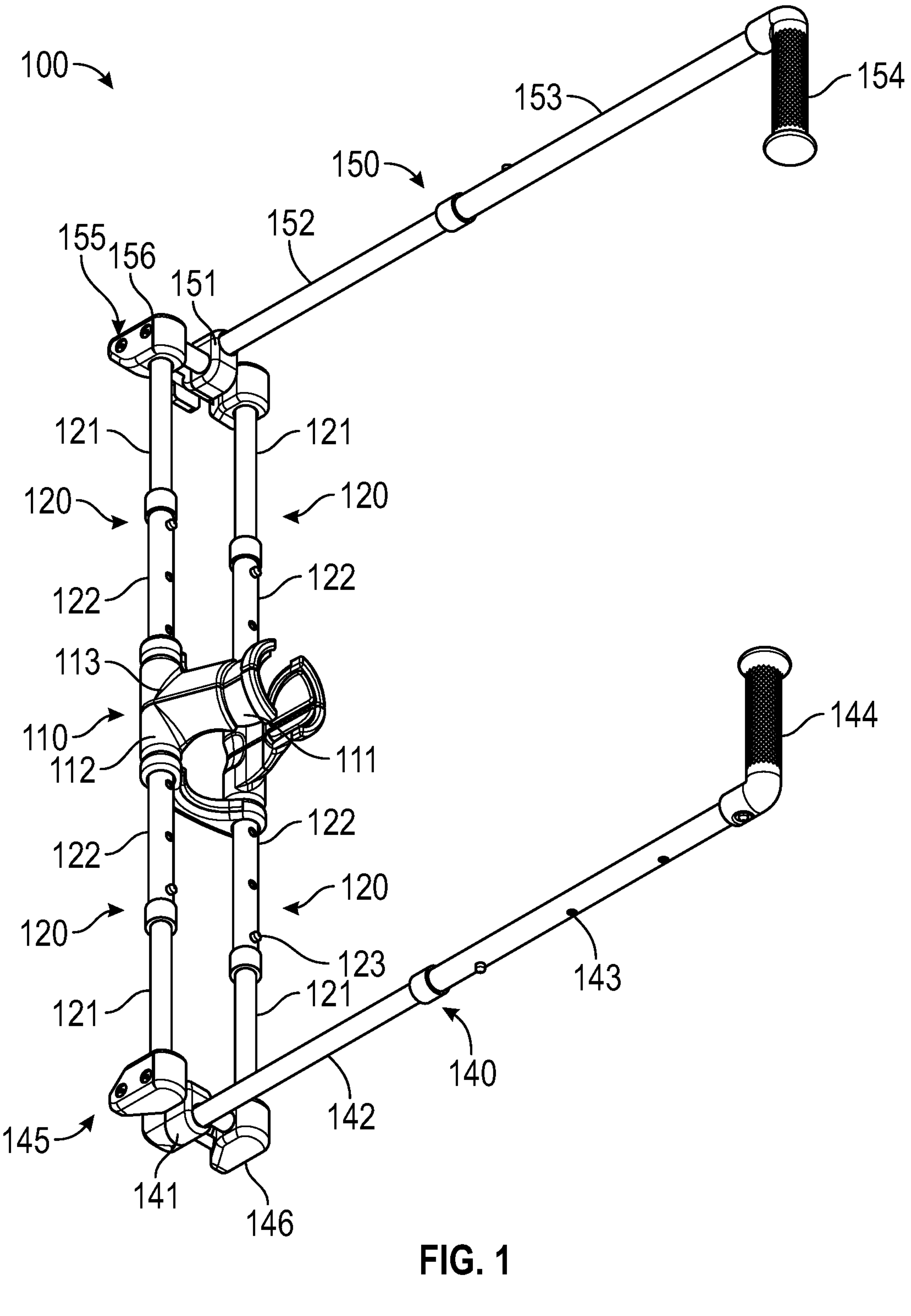
FIG. 1 is a front perspective view of a manipulator for a massage device in an extended configuration, in accordance with aspects of this disclosure.

Descriptions of technical features or aspects of an exemplary embodiment of the disclosure should typically be considered as available and applicable to other similar features or aspects in another exemplary embodiment of the disclosure. Accordingly, technical features described herein according to one exemplary embodiment of the disclosure may be applicable to other exemplary embodiments of the disclosure, and thus duplicative descriptions may be omitted herein.

Exemplary embodiments of the present disclosure will be described more fully below (e.g., with reference to the accompanying drawings). Like reference numerals may refer to like elements throughout the specification and drawings.

Terms including "generally," "about," "substantially," and the like, as utilized herein, are meant to encompass variations, e.g., manufacturing tolerances, material tolerances, use and environmental tolerances, measurement variations, and/or other variations.

With reference to FIGS. 1-4, a manipulator 100 for a massage device 10 is shown in an extended configuration. The manipulator 100 generally includes a pair of main rods 120, a first arm rod 140, a second arm rod 150, and a mount 110. The manipulator 100 may include an extended configuration (FIG. 1), for use, and a folded configuration (FIGS. 5 and 6), e.g., for storage.

The main rods 120 are parallel to each other and transitionable from a first configuration to a second configuration. When in the first configuration each of the main rods 120 defines a first length and when in the second configuration each of the main rods 120 defines a second length greater than the first length. In aspects, each of the main rods 120 may be a telescoping tube. Each of the main rods 120 generally includes a first segment 122, a second segment 121, and a detent assembly 123. The first segment 122 may be a tube configured to receive the second segment 121. The detent assembly 123 includes a hole 189 (and/or a series of aligned holes to enable different rod lengths) and spring biased plunger 188 configured to protrude into the hole to maintain a length of the pair of main rods 120.

Figure 2:
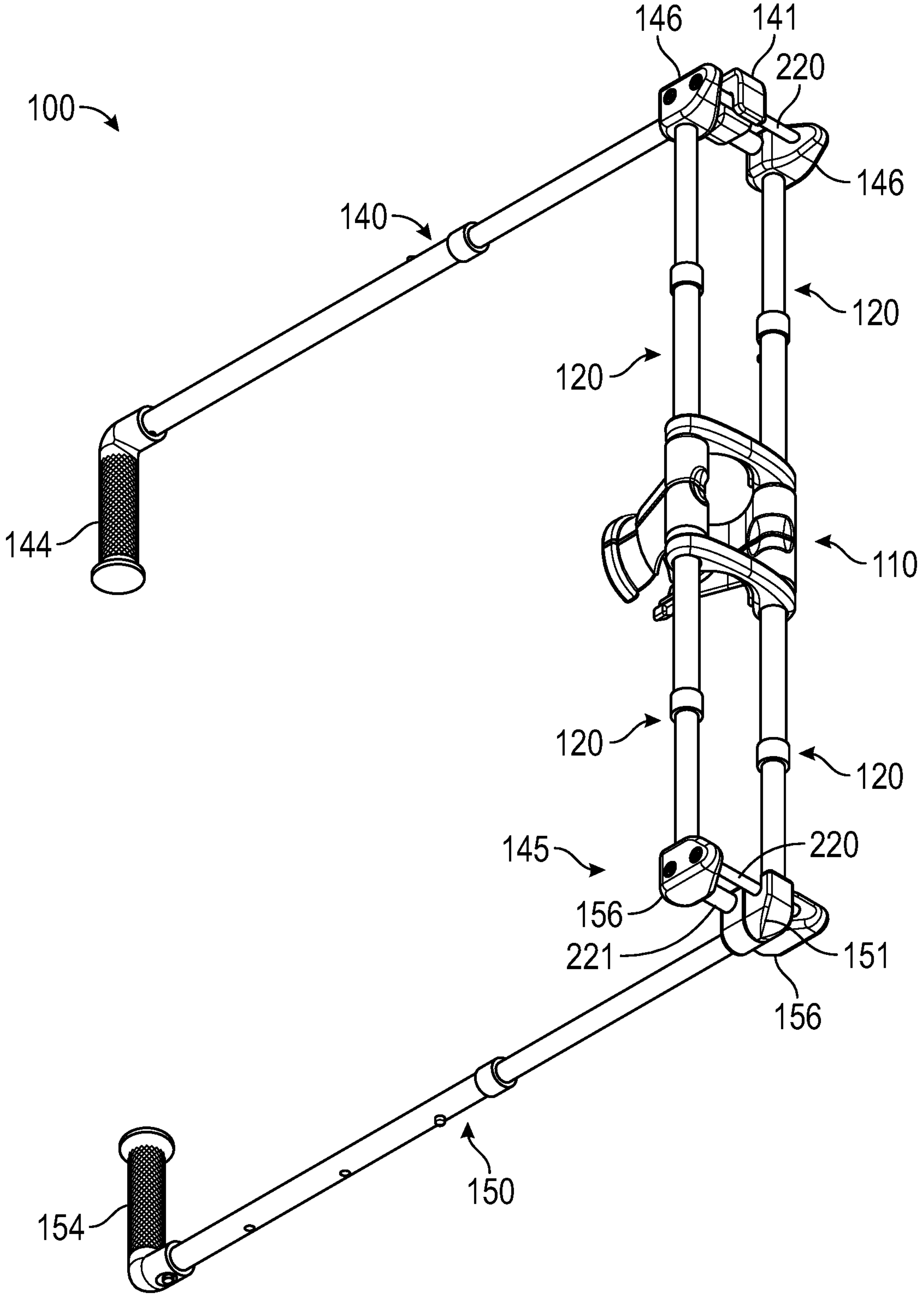
FIG. 2 is a rear perspective view of the manipulator of FIG. 1 provided in accordance with aspects of this disclosure.
Figure 3:
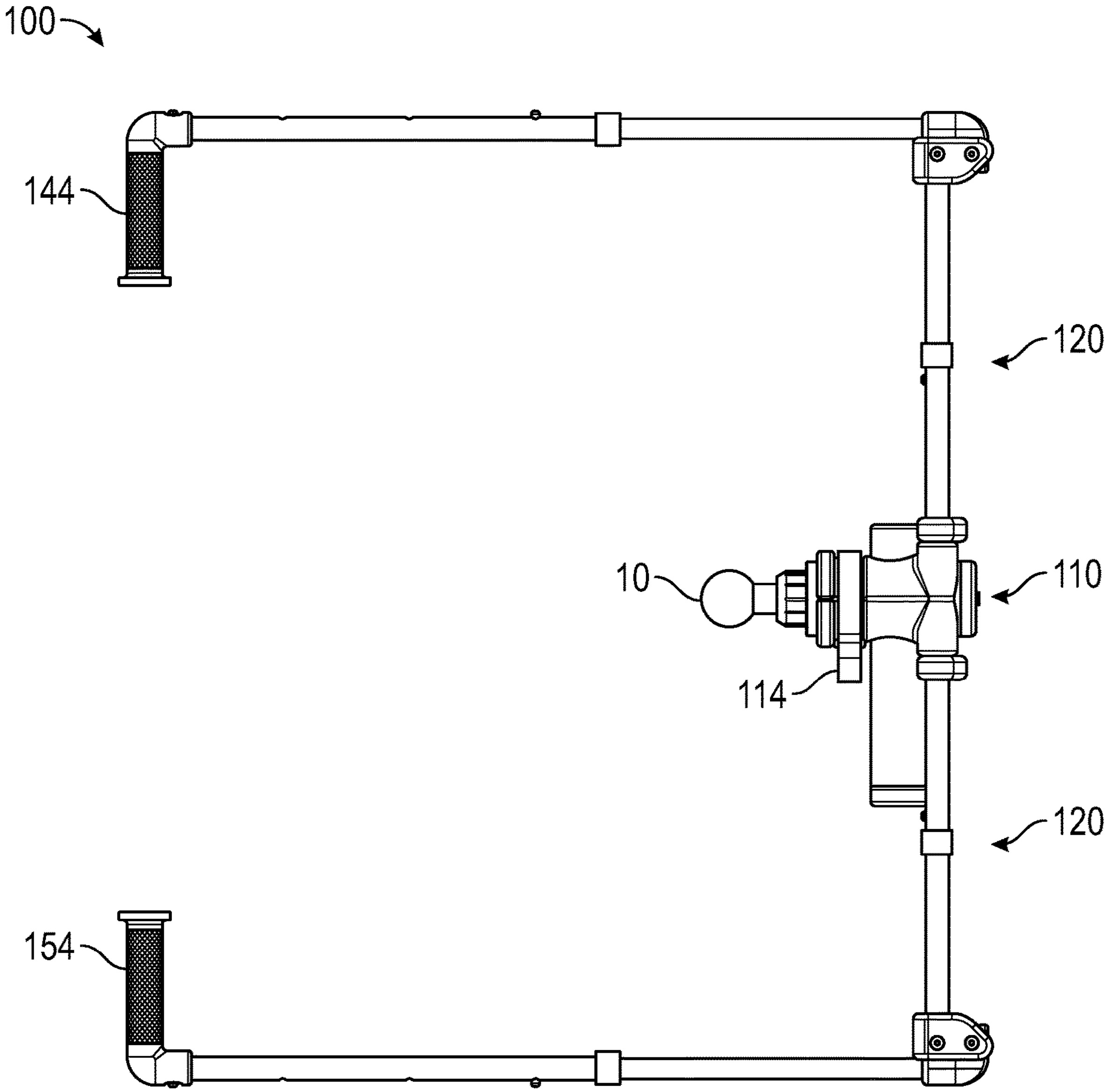
FIG. 3 is a top view of the manipulator of FIG. 1 supporting the massage device, in accordance with aspects of this disclosure.
Figure 4:
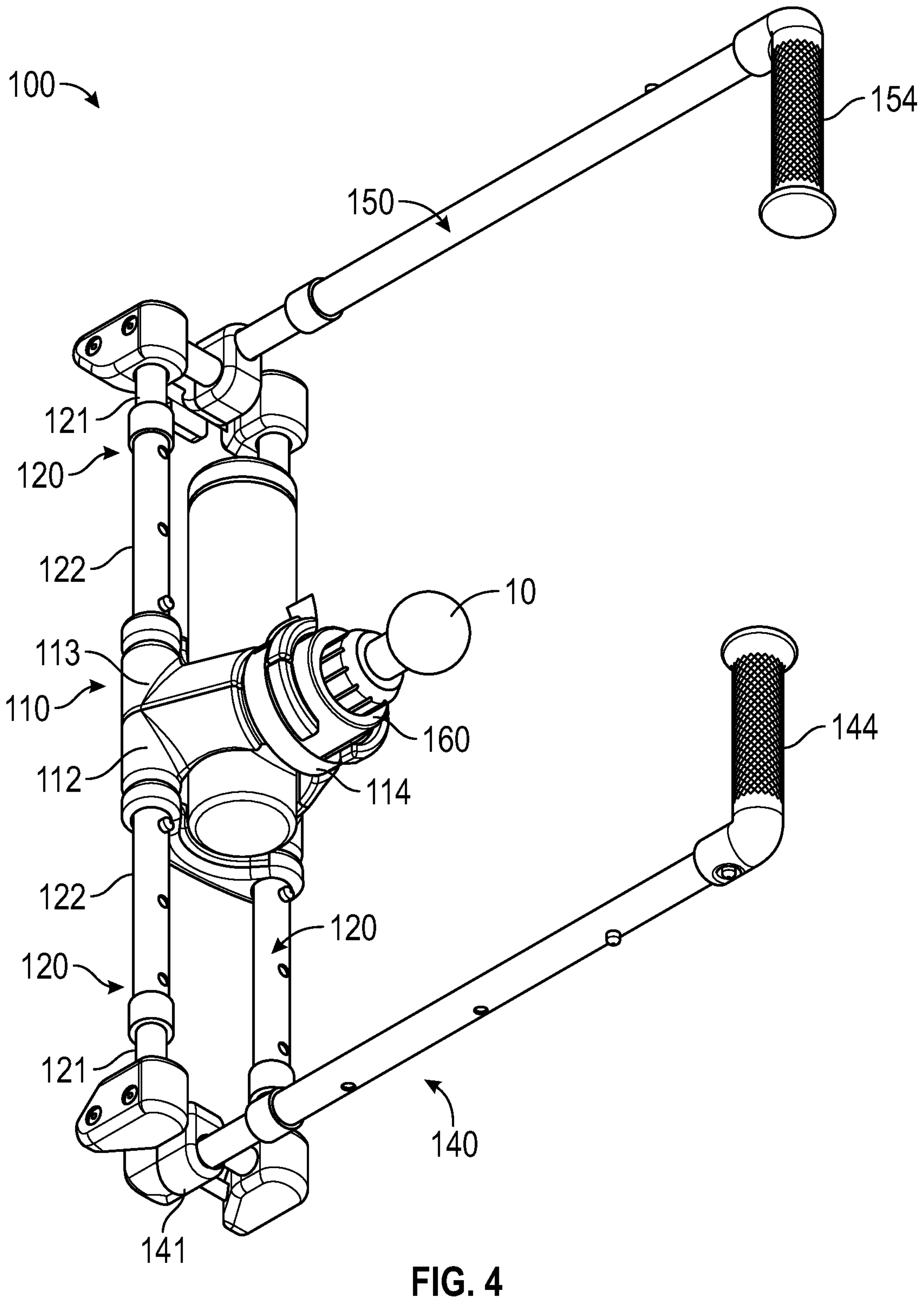
FIG. 4 is a front perspective view of the manipulator of FIG. 1 supporting the massage device, in accordance with aspects of this disclosure.
Figure 7:
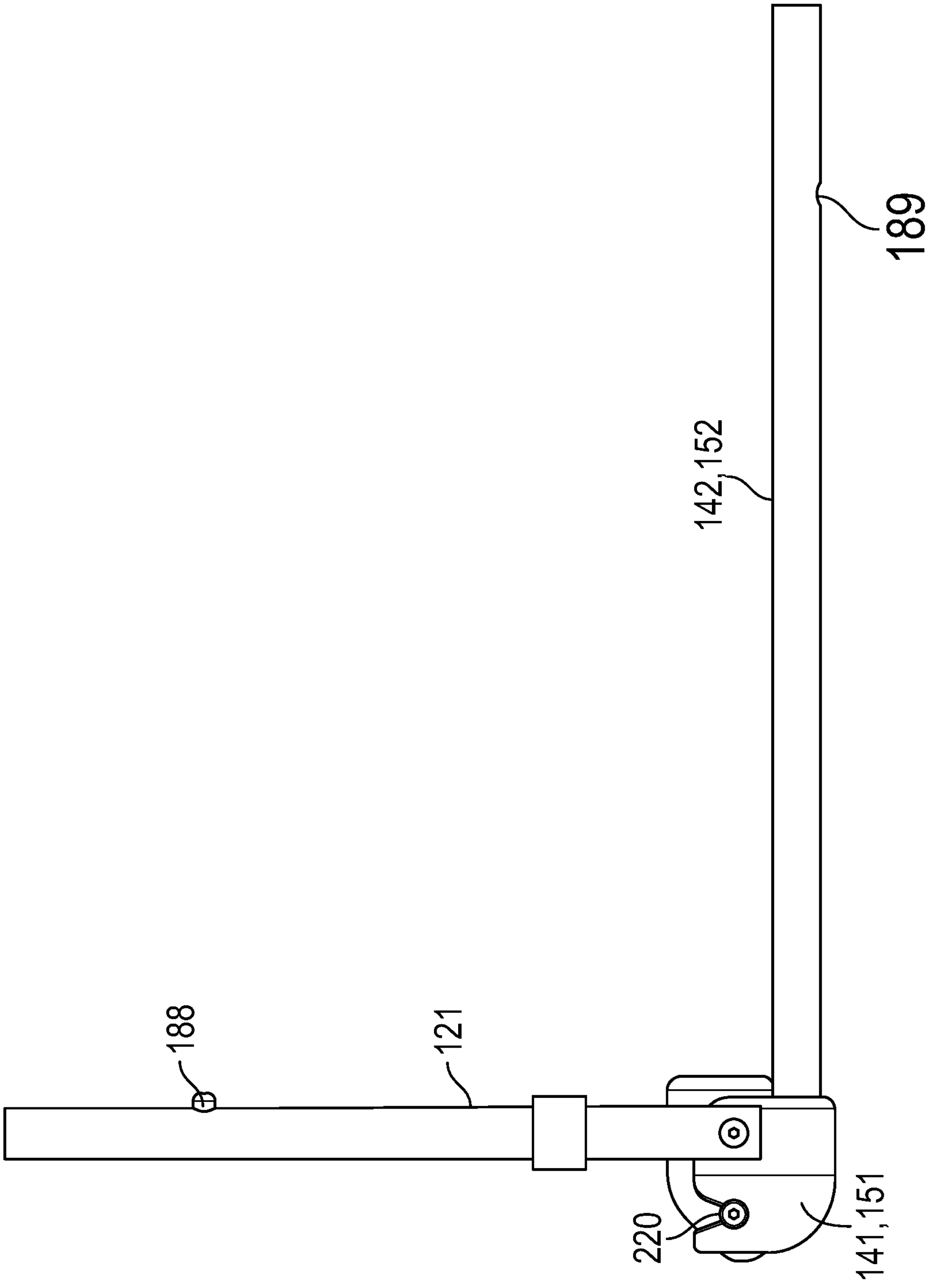
FIG. 7 is a side view of the hinge lock of the manipulator of FIG. 1 in a folded configuration, in accordance with aspects of this disclosure.
Figure 8:
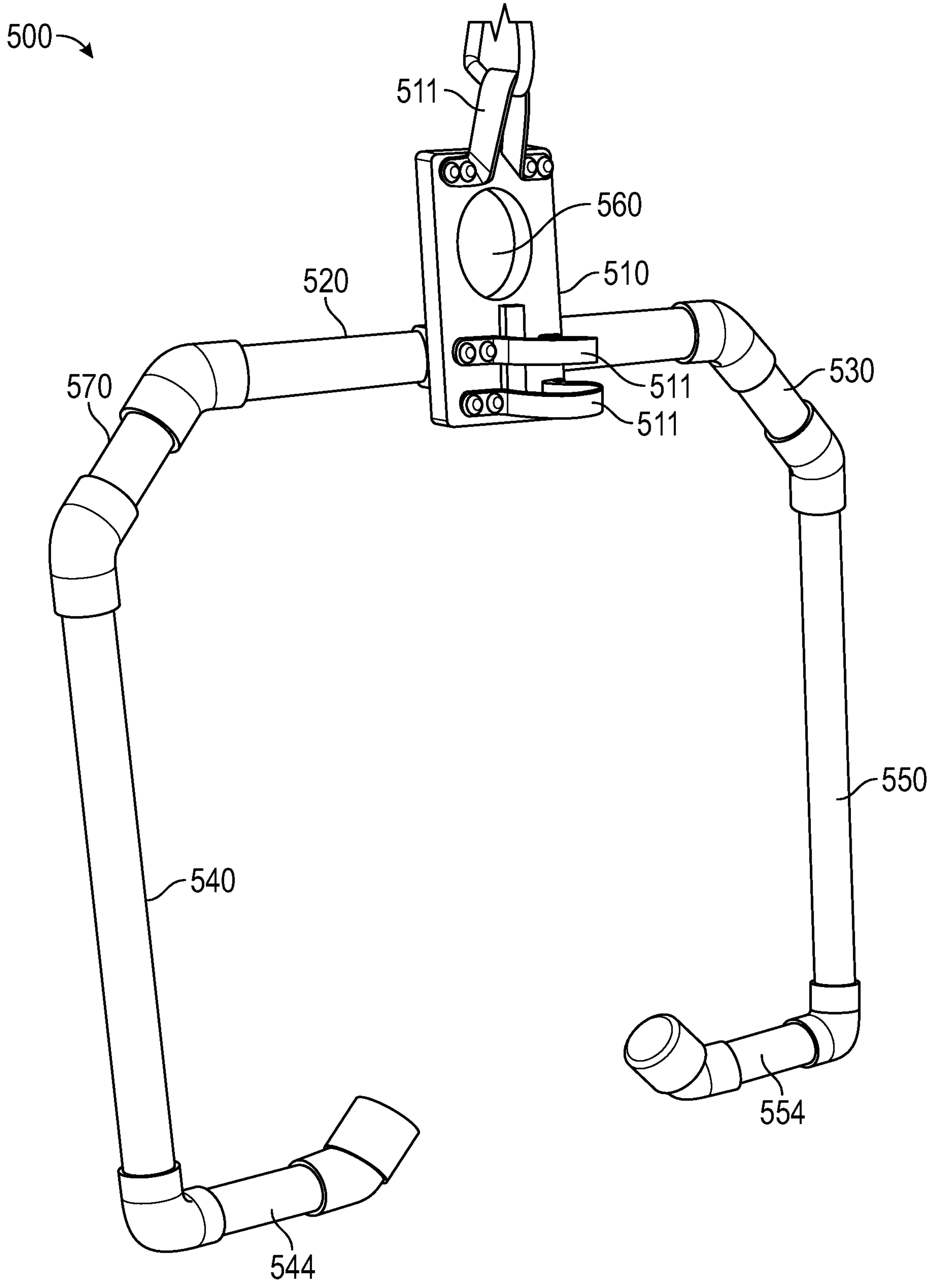
FIG. 8 is a front perspective view of another example of manipulator for a massage device, in accordance with aspects of this disclosure.
Figure 9:
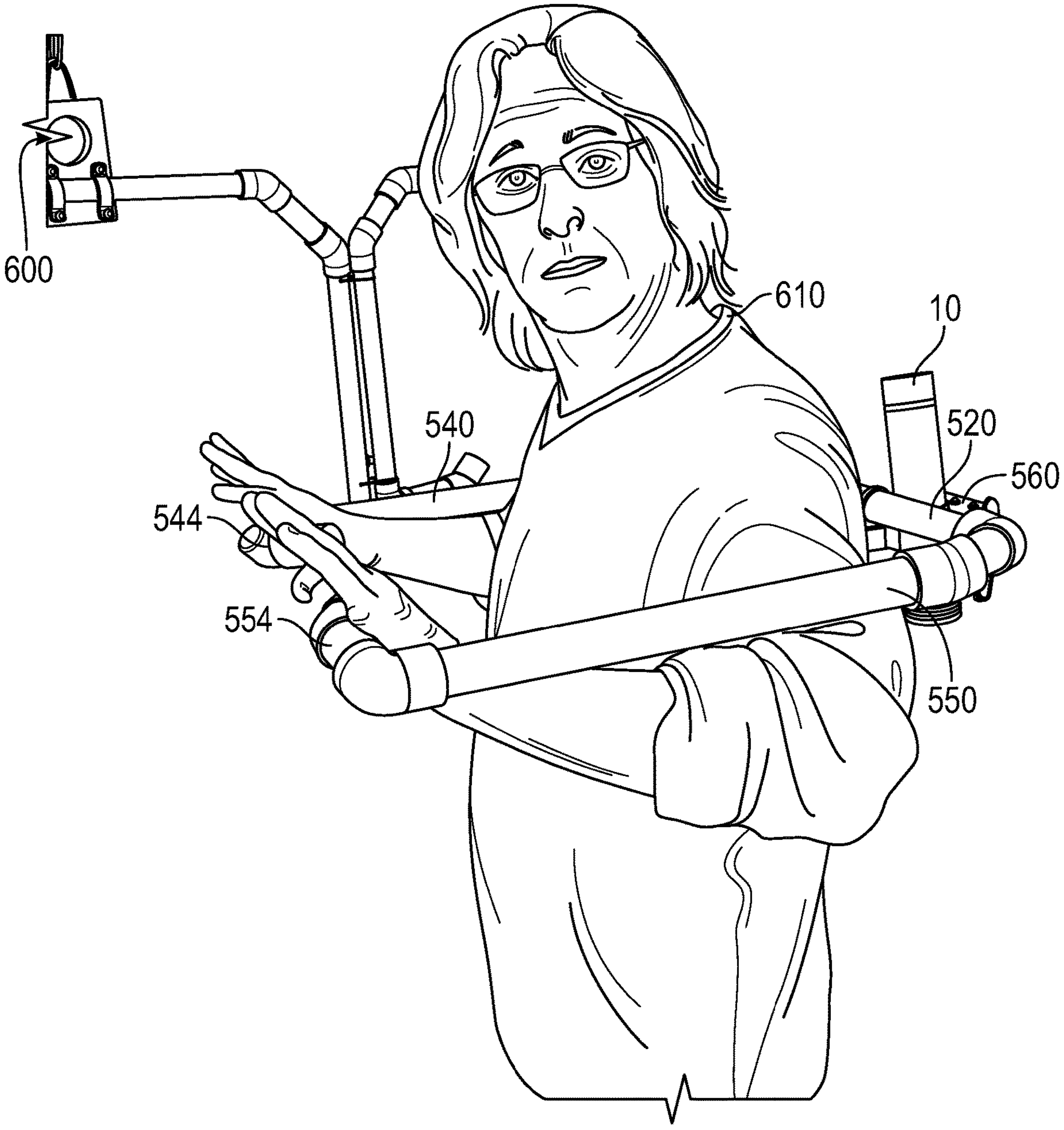
FIG. 9-13 are various views of a user using the device of FIG. 8, in accordance with aspects of this disclosure.
Figure 10:
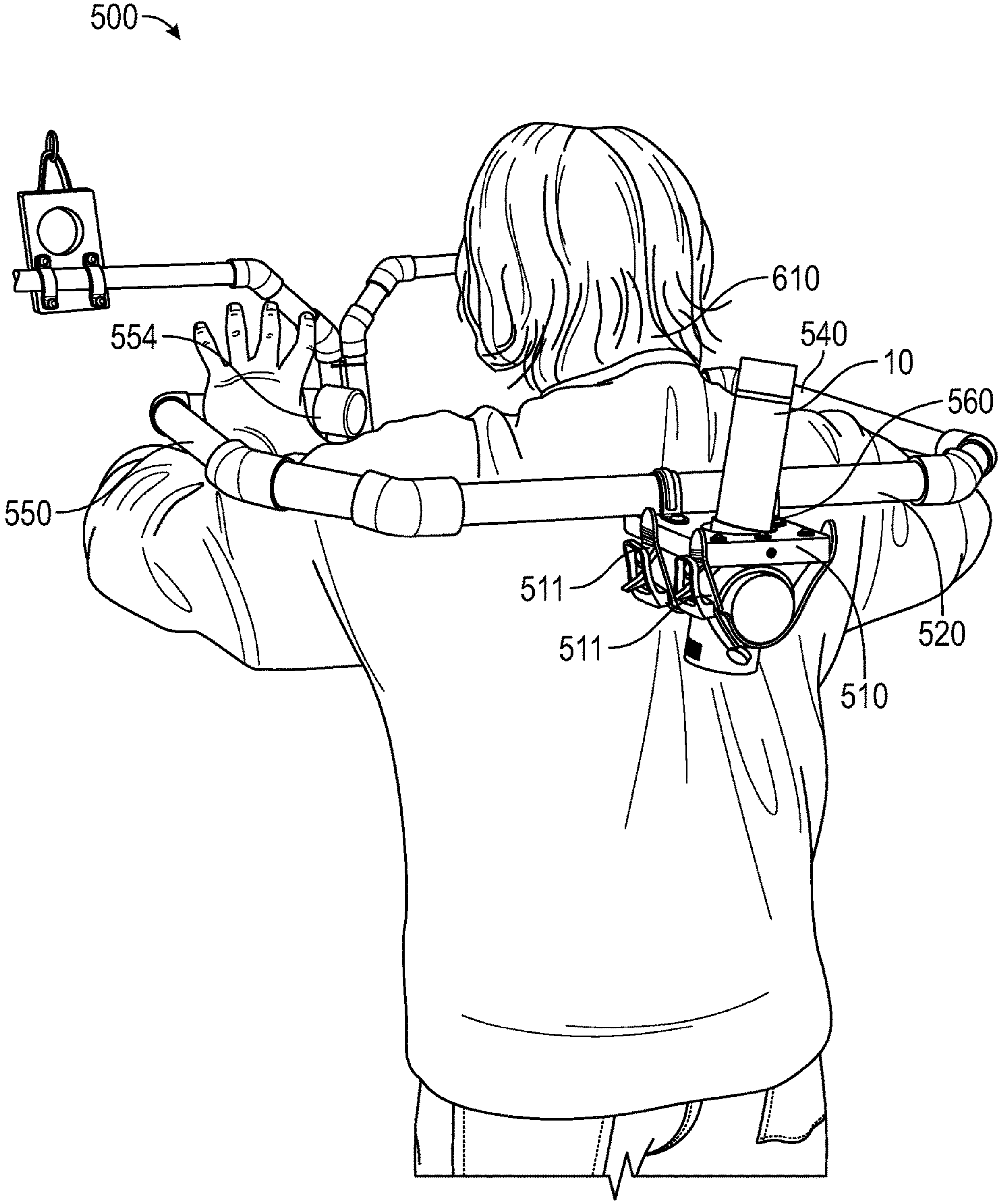
Figure 11:
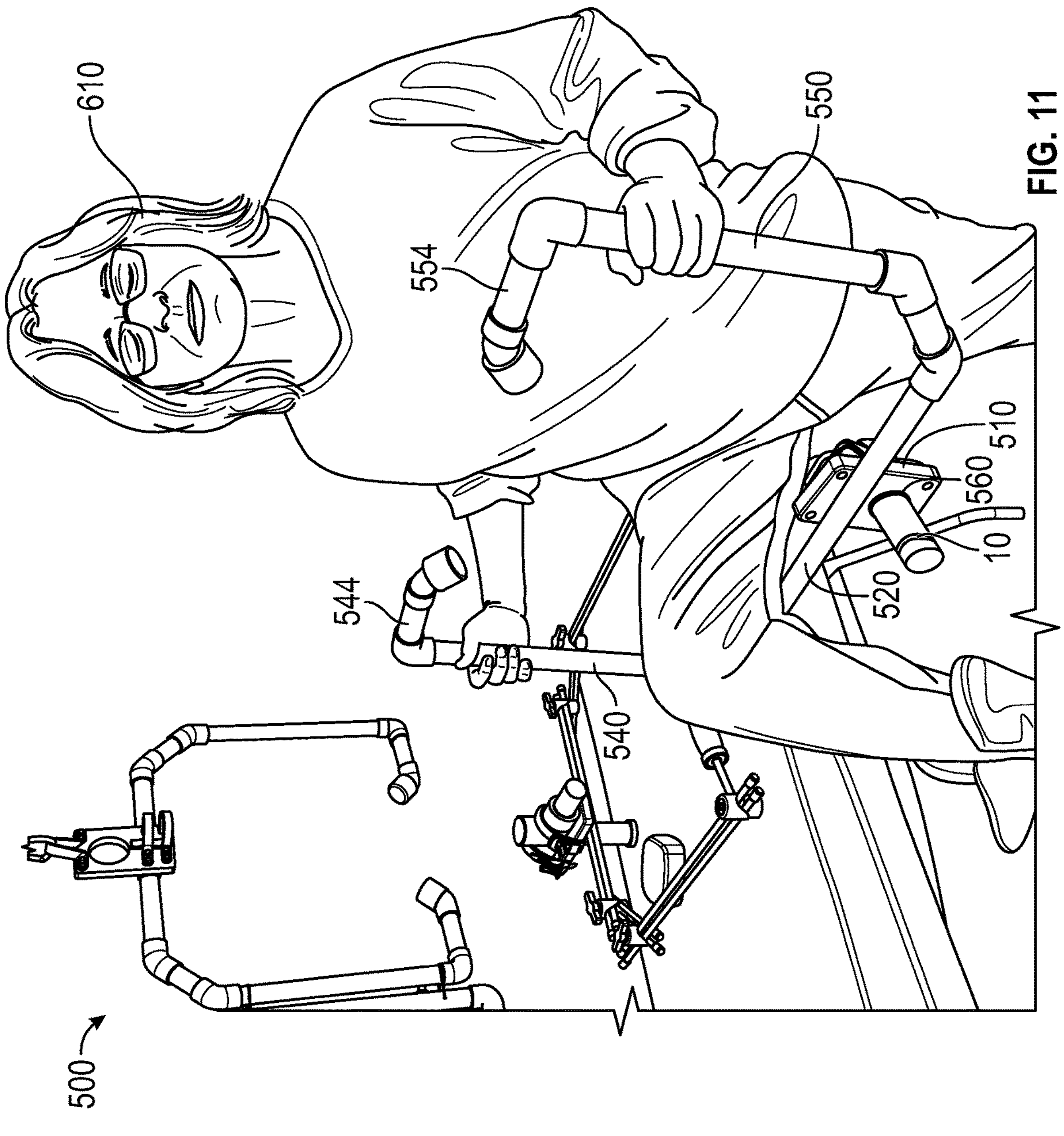
Figure 12:
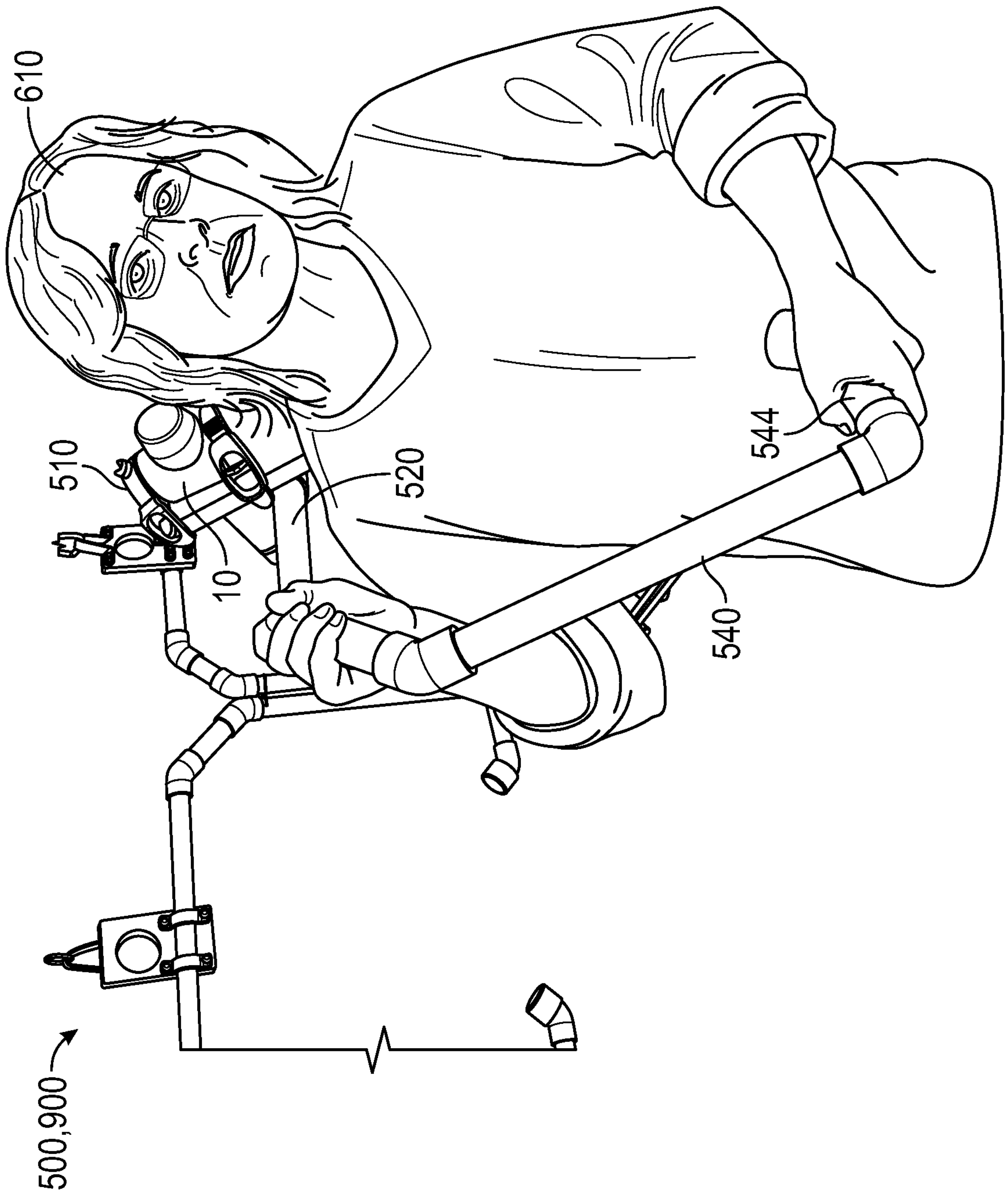
Figure 13:
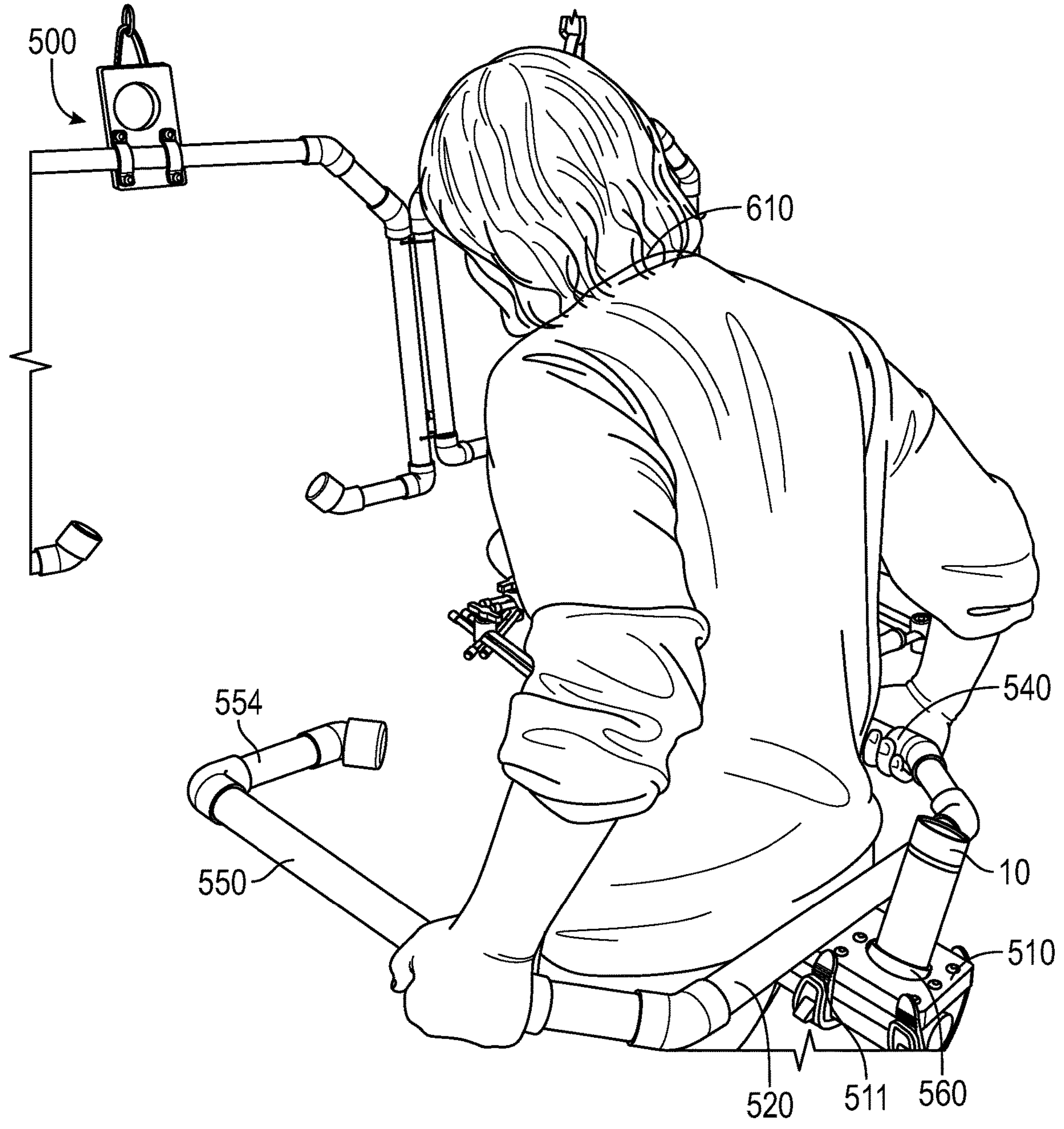

The first arm rod 140 and the second arm rod 150 are pivotably coupled to a respective end portion of one of the main rods 120 by a respective elbow assembly 145, 155 (e.g., a first elbow assembly and a second elbow assembly). Each elbow assembly 145, 155 includes a pair of rod couplers 146, 156, a respective hinge lock 141, 151, a first cross bar 220, and a second cross bar 221 (FIG. 7). Each rod coupler of the pair of rod couplers 146, 156 is configured to be mounted to a respective end portion of the first cross bar 220 and the second cross bar 221 (FIG. 2). Each hinge lock 141, 151 is disposed on the second cross bar 121 in a pivotable manner and is configured to lock around the first cross bar 220 (FIG. 2).

The first handle 142 and second handle 152 may be coupled to the first arm rod 140 and the second arm rod 150 by a detent assembly 123 (FIG. 7). A first handle 142 may be pivotably coupled to the first arm rod 140 and a second handle 152 may be pivotably coupled to the second arm rod 150. The first handle 142 and second handle 152 may be a rigid material such as plastic and/or metal, or may include a rubberized grip.

Each of the first arm rod 140 and second arm rod 150 is transitionable from a third length to a fourth length. Each of the first arm rod 140 and second arm rod 150 may be a telescoping tube, including a detent assembly 123. By transitioning the length of each of the main rods 120, the first arm rod 140, and the second arm rod 150, a user can find an optimal ergonomic configuration for their particular needs or desired angle at which the massage device 10 targets a portion of the user's body.

The mount 110 may be coupled to a central portion of the pair of main rods 120 and configured to receive and secure the massage device 10. The mount 110 includes a first portion 112 and a second portion 113. The first portion and second portion are configured to be slidably adjusted (e.g., in a clamshell fashion) to adapt to any size massage device 10. The first portion 112 and the second portion 113 each includes a recess 111. The massage device 10 may be secured to the mount 110 by positioning a strap 114 in recess 111 and tightening the strap 114.

The massage device 10 may be any therapeutic massager such as a those with a reciprocating massage head or those with a handle or gun-shaped configuration known in the art of massage devices.

The pair of main rods 120, the first arm rod 140, and the second arm rod 150 may be coupled to each other and arranged so as to approximate a U shape. In this arrangement, with a massage device 10 secured to the mount 110, a user is able to grab the first and second arm rods 140, 150, or the first and second handles 142, 152, and step into a gap defined between the first arm rod 140 and the second arm rod 150. The user is then able to move the manipulator 100 to any desirable location to massage the user's back, or other difficult to reach portion of the user's body. This arrangement of the manipulator 100 provides ergonomic benefits over other massage device holders that approximate a curved cane type shape, because it does not require a user to bend one's hands, arms, or elbows to an opposite side, for example, by moving the left arm across to the right arm, or vice versa. For example, for a person recovering from a right shoulder injury or surgery who is limited in his/her range of motion for the right shoulder, he/she can still easily manipulate the manipulator 100 to massage his/her back via the massage device 10. Further, this arrangement more evenly distributes the load of the manipulator 100 across a user's hands, arms, and other muscles or portions of the body required to hold the manipulator 100.

In aspects, each rod of the pair of main rods 120, first arm rod 140, and the second arm rod 150 includes an outer tube and an inner tube slidable relative to one another so as to be able to transition between the various lengths thereof. In aspects, the outer tubes and inner tubes may be secured to respective inner or outer tubes via a locking nut at the end of the outer tube that grips the inner tube at any desirable location along the inner tube. For example, the inner tube may be slid out such that just an end portion of the inner tube is within the outer tube, and the end portion gripped by the locking nut.

In other aspects, each of the outer tubes and inner tubes defines a plurality of sockets arranged longitudinally along each of the outer tubes and inner tubes, and is configured to receive a pin for securing the outer tubes and inner tubes together. The pin may be a clevis pin inserted into a socket of the outer tube and a socket of the inner tube placed in alignment. Alternatively, instead of a plurality of sockets, the inner tube may include a button pin at an end thereof such that, as the inner tube is slid out of the outer tube, the button pin may be sequentially pushed into a socket of the outer tube by an internal spring force of the button pin. Any means for securing the inner and outer tubes to each other known by those of ordinary skill in the art may be employed.

The mount 110 may be slidably coupled to the pair of main rods 120. This enables a user to adjust a location of the mount 110 on the pair of main rods 120 to enable the user to further ergonomically target a specific portion of the body the user wishes to massage with the massage device 10 secured to the mount 110. The mount 110 may be secured to the pair of main rods 120 via any means for securing a mount 110 to the pair of main rods 120 known in the art. In aspects, the mount 110 may be rotatably secured to the pair of main rods 120 to enable an angle between the mount 110 relative to a central longitudinal axis of the pair of main rods 120 to be changed. This advantageously enables a user to set the massage device 10 at whichever angle the user desires. For example, the user may set the mount 110 at a 60 degree angle so as to be able to point the massage device downwards towards a user's shoulder or neck. In aspects, the mount 110 may be set to a 0 or 15 degree angle so as to be able to target a portion of the user's back with the massage device 10 when manipulating the manipulator 100.

Figure 5:
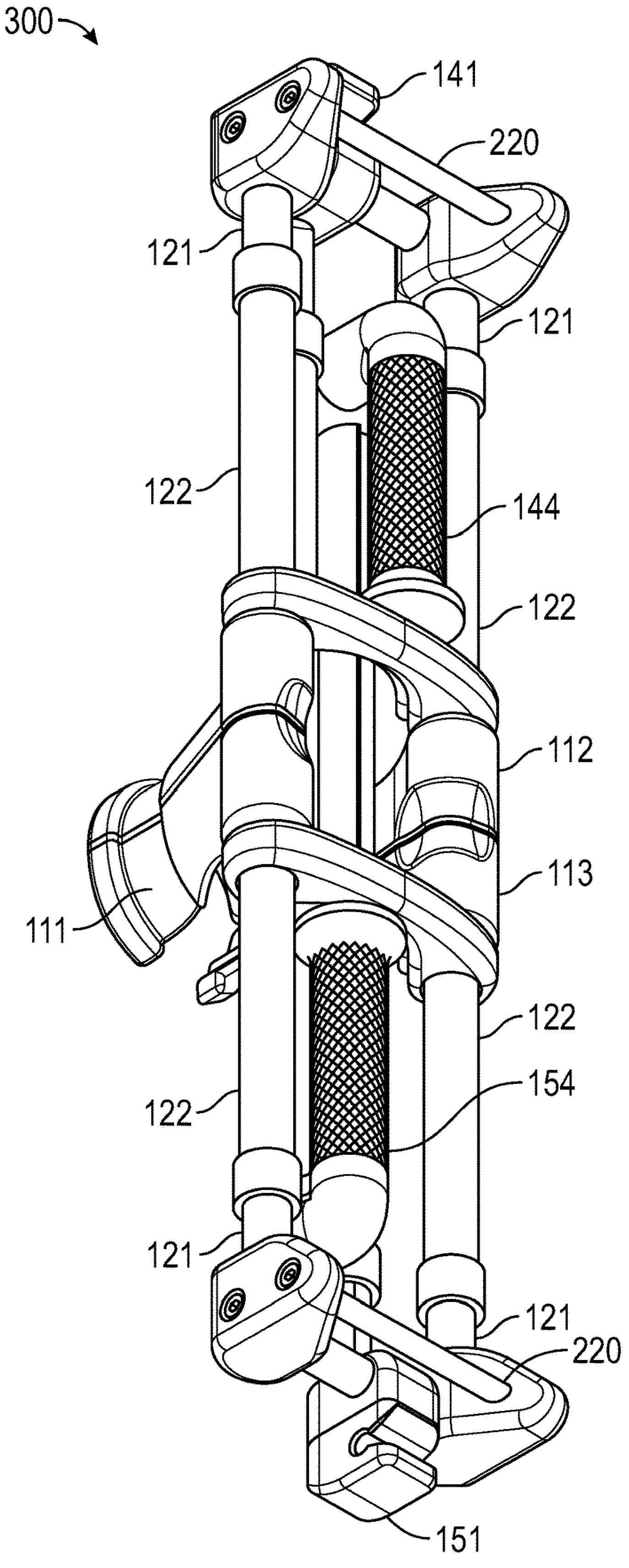
FIG. 5 is a rear perspective view of the manipulator of FIG. 1 in a folded configuration, in accordance with aspects of this disclosure.
Figure 6:
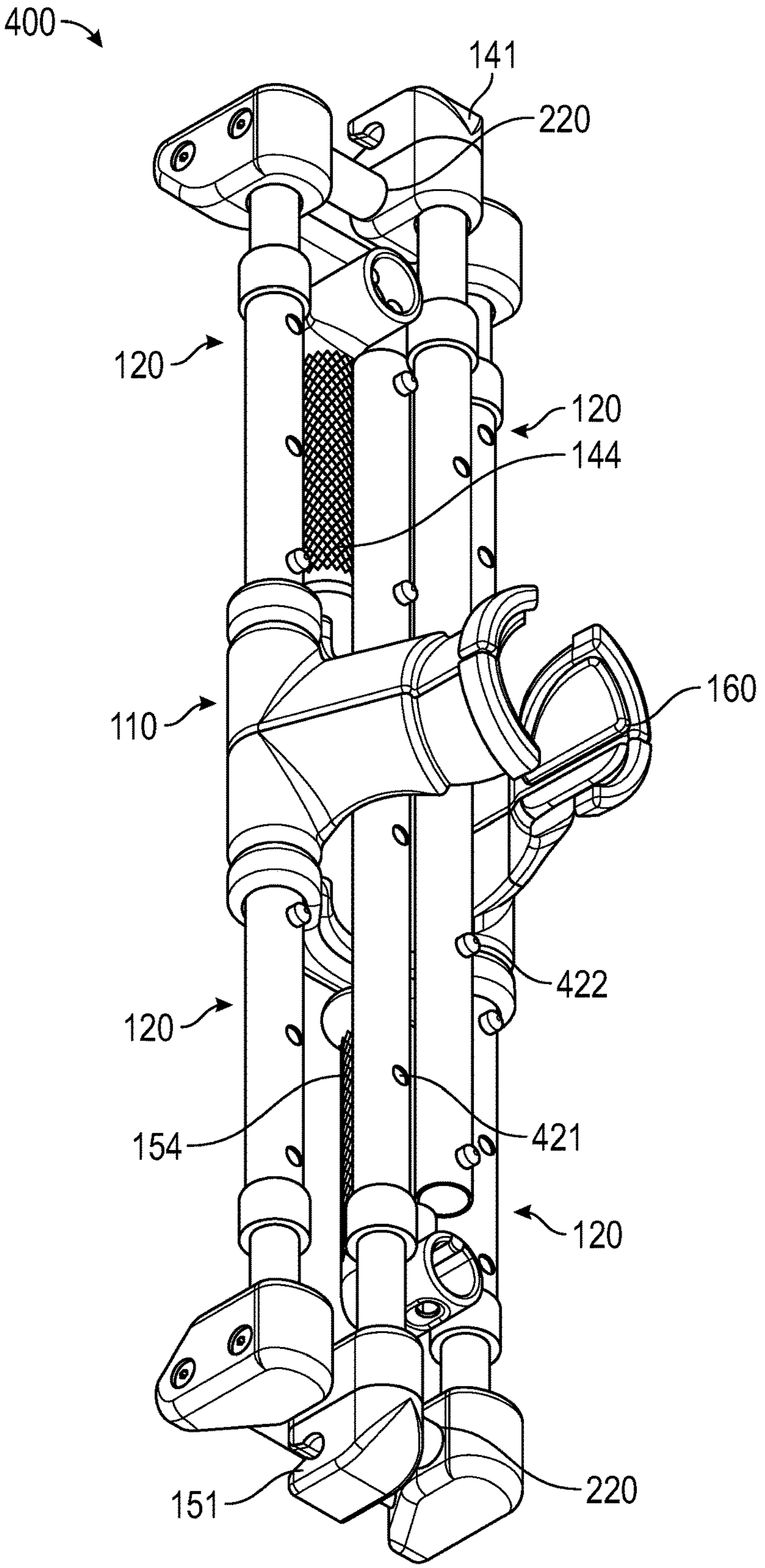
FIG. 6 is a front perspective view of the de manipulator vice of FIG. 1 in a folded configuration, in accordance with aspects of this disclosure.

Referring to FIGS. 5 and 6, when the manipulator 100 is in the folded configuration, the first arm rod 140 and second arm rod 150 may be disconnected for storage.

With reference to FIGS. 8-13, a mounting system 500 for a massage device 10 is shown. The mounting system 500 is similar to the manipulator 100, and for brevity, only the differences will be discussed. The mounting system 500 includes a main spine 520, a first rod 570, a second rod 530, a third rod 540, and a fourth rod 550 each fixedly coupled to one another. The mounting system 500 includes a mount 560 slidably disposed on the main spine and configured to receive a massage device 10. The third rod 540 and the fourth rod 550 each have a respective handle 544, 554 disposed on an end portion.

The mounting system 500, similar to the manipulator 100, defines a generally U shape. The mounting system 500 may be provided in multiple sizes so as to define smaller or larger approximated U shapes. The first rod 570 and the third rod 540 are mirrored opposite the second rod 530 and the fourth rod 550 about a centerline. This may be advantageous, for example, for physical therapists to be able to use an appropriately sized mounting system 500 for any given user (or, in the example, patient).

The mount 560 may include a plate 510 and a means 511 for securing the massage device 10 to the plate 510. The plate 510 may define an opening for receiving a handle of the massage device 10 and include at least one strap that wraps around the massage device 10 to secure the massage device 10 to the plate. The means for securing the massage device may be a plurality of straps, a clip, a mechanical gripper, a magnet, a lock nut, or any other suitable means for securing the massage device 10 to the plate 510 known in the art. In aspects, the mount 560 may define a cup holder for receiving a cylindrical portion of a massage device 10.

In aspects, the mount 560 may be rotatably secured to the main spine 520 to enable an angle between the mount 560 relative to a central longitudinal axis of the main spine 520 to be changed. This advantageously enables a user to set the massage device 10 at whichever angle the user desires. For example, the user may set the mount 110 at a 60 degree angle so as to be able to point the massage device downwards towards a user's shoulder or neck. In aspects, the mount 560 may be set to a 0 or 15 degree angle so as to be able to target a portion of the user's back with the massage device 10 when manipulating the mounting system 500.

The mount 110 of the manipulator 100 (FIG. 1) or the mount 560 of the mounting system 500 (FIG. 8) may include a battery configured to electrically coupled to the massage device 10 to provide power to the massage device 10. Additional batteries may be provided in at least one of the rods, rails, handles of the manipulator 100, or mounting system 500 and electrically coupled to the massage device 10 when the massage device 10 is secured to the mounts 110, 560. In aspects, docking magnets may be provided to facilitate electrical connection between the batteries and the massage device and to secure the massage device 10 to the manipulator 100 or mounting system 500.

In aspects, at least one of the handles (e.g., 142, 152, 544, or 554) may include one or more switches for operating the massage device 10. The switch may be configured to power on or off the massage device or to operate the massage device between different modes. For example, the massage device 10 may be a massage gun with a reciprocating gun head that operates in a faster massage mode or a slower massage mode and the switch is configured to toggle the massage device between the faster massage mode or the slower massage mode. This advantageously allows a user to control the massage during the massage as opposed to prior devices that require a user to pause the massage to return to the massage device 10 to adjust the massage mode.

The faceplate 510 is configured to be heated or cooled. This advantageously enables a user to press the faceplate 510 against a targeted area of the user's body to both be massaged by the massage device 10 while also receiving a heat or cold treatment to further provide temperature therapy to the targeted area. The faceplate 510 may include a thermoelectric heat pump or Peltier device so as to be able to heat or cool the faceplate 510. The faceplate 510 defines an annulus having an inner diameter larger than a diameter of a massage or gun head of the massage device 10 to enable the massage or gun head to pass through the annulus. It is contemplated that the mount 100 of FIG. 1 may be used with mounting system 500. It is contemplated that the mount 560 of FIG. 8 may be used with manipulator 100.

From the foregoing and with reference to the various figure drawings, those skilled in the art will appreciate that certain modifications can also be made to the disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A manipulator for a massage device comprising:

a pair of main rods having a first end pivotably coupled to a first elbow assembly and a second end opposite the first end that is pivotably coupled to a second elbow assembly, the pair of main rods transitionable between a first configuration and a second configuration, wherein, when in the first configuration the pair of main rods define a first length and when in the second configuration the pair of main rods define a second length greater than the first length;

a first arm rod pivotably coupled to the first elbow assembly;

a second arm rod pivotably coupled to the second elbow assembly; and a mount coupled to a central portion of the pair of main rods and configured to receive and secure a massage device, wherein each of the first elbow assembly and the second elbow assembly include:

a hinge lock;

a first cross bar;

a second cross bar parallel to the first cross bar; and a pair of rod couplers, wherein each rod coupler of the pair of rod couplers is configured to be mounted to a respective end portion of the first cross bar and the second cross bar.

2. The manipulator of claim 1, wherein the manipulator is transitionable from an extended configuration to a folded configuration.

3. The manipulator of claim 1 wherein the mount includes:

a first portion; and a second portion;

wherein the first portion and the second portion define an opening for receiving a handle of a massage device.

4. The manipulator of claim 3, wherein the first portion and the second portion are configured to be slidably adjusted.

5. The manipulator of claim 1, wherein the first arm rod and the second arm rod are each transitionable from a third length to a fourth length.

6. The manipulator of claim 5, wherein the mount is slidably coupled to the pair of main rods such that the mount is fixed to the pair of main rods at any location along the pair of main rods.

7. The manipulator of claim 5, further comprising a first handle coupled to the first arm rod and a second handle coupled to the second arm rod.

8. The manipulator of claim 1, wherein the first arm rod and the second arm rod are removable.

9. The manipulator of claim 1, wherein the hinge lock is disposed on the second cross bar in a pivotable manner and is configured to lock around the first cross bar.

* * * * *